(12) United States Patent
Tsuda et al.

(10) Patent No.: US 8,393,176 B2
(45) Date of Patent: Mar. 12, 2013

(54) DOWNDRAW METHOD FOR PRODUCING GLASS SHEET

(75) Inventors: Masahiro Tsuda, Tokyo (JP); Takashi Mukai, Tokyo (JP); Takeshi Naraki, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/349,810

(22) Filed: Jan. 13, 2012

(65) Prior Publication Data

US 2012/0111060 A1 May 10, 2012

Related U.S. Application Data

(63) Continuation of application No. PCT/JP2010/061279, filed on Jul. 1, 2010.

(30) Foreign Application Priority Data

Jul. 13, 2009 (JP) ................................. 2009-164347

(51) Int. Cl.
*C03B 17/06* (2006.01)

(52) U.S. Cl. ...................... 65/53; 65/90; 65/193; 65/195

(58) Field of Classification Search .............. 65/90, 193, 65/195, 53
See application file for complete search history.

(56) References Cited

U.S. PATENT DOCUMENTS

| 1,565,307 | A | * | 12/1925 | Blair ................................ 65/44 |
| 3,275,429 | A | * | 9/1966 | Javaux ............................ 65/185 |
| 2005/0183455 | A1 | * | 8/2005 | Pitbladdo .................... 65/29.11 |
| 2007/0062219 | A1 | * | 3/2007 | Blevins et al. ..................... 65/91 |
| 2008/0264104 | A1 | * | 10/2008 | Boratav et al. .................... 65/90 |
| 2009/0250497 | A1 | * | 10/2009 | Cox et al. ........................... 225/2 |

FOREIGN PATENT DOCUMENTS

| JP | 3-55422 B2 | 8/1991 |
| JP | 05-124827 A | 5/1993 |
| JP | 2008-531452 A | 8/2008 |
| WO | WO 2006/091730 A1 | 8/2006 |

* cited by examiner

*Primary Examiner* — Queenie Dehghan
(74) *Attorney, Agent, or Firm* — Foley & Lardner LLP

(57) ABSTRACT

The present invention relates to a method for manufacturing a glass sheet, the method including: running down molten glass along both side surfaces of a molded body; joining and integrating the molten glass just under a lower edge part of the molded body; and drawing downward and molding an integrated sheet-shaped glass ribbon, in which a guide member which contacts to an end in a width direction of a joined molten glass is provided, and a relative position and/or a relative angle between the guide member and a lower edge of the molded body is/are adjusted.

14 Claims, 15 Drawing Sheets

DOWNDRAW METHOD FOR PRODUCING GLASS SHEET

TECHNICAL FIELD

The present invention relates to a method and a device for manufacturing a glass sheet.

BACKGROUND ART

A method called a fusion process is conventionally known as a manufacturing method of a high-quality glass sheet (for example, see Patent Document 1). The fusion process is a method in which molten glass is run down along both side surfaces of a molded body with a cross section of a wedge shape converging downward and also the molten glass is joined and integrated just under a lower edge part of the molded body and while cooling an integrated sheet-shaped glass ribbon, the glass ribbon is drawn downward and molded.

Patent Document 1 describes the fact that in order to inhibit molten glass running down from contracting in a width direction by surface tension, the vicinity of both right and left ends of both side surfaces of a molded body is provided with a web-like member and an extension member intersecting with the web-like member and downward inclined to the web-like member. The end in the width direction of the molten glass runs along a surface of the web-like member and then runs along a surface of the extension member.

Patent Document 2 describes the fact that in order to inhibit molten glass running down from contracting in a width direction by surface tension, the vicinity of both right and left ends of both side surfaces (front and back surfaces) of a molded body is provided with a guide wall for integrally coupling the front and back at the lower edge of the molded body and a triangular fin-like projection body in which two sides are fixed in contact with an inner wall of the lower end of the guide wall and the lower edge of the molded body. The end in the width direction of the molten glass contacts with the fin-like projection body and wets, whereby a force by which the molten glass is expanded outward is exerted and the molten glass can be inhibited from contracting inward.

BACKGROUND ART DOCUMENTS

Patent Document

Patent Document 1: JP-T-2008-531452
Patent Document 2: JP-B-3-55422

SUMMARY OF THE INVENTION

Problems that the Invention is to Solve

However, in a manufacturing method of Patent Document 1, the web-like member and the extension member with which the end in the width direction of the molten glass contacts are fixed to the lower edge of the molded body, so that it may be difficult to adjust a shape dimension of a glass ribbon.

Similarly, in a manufacturing method of Patent Document 2, the fin-like projection body with which both ends in the width direction of the molten glass contacts is fixed to the lower edge of the molded body, so that it may be difficult to adjust a shape dimension of a glass ribbon.

The invention has been implemented in view of the problem described above, and an object of the invention is to provide a method and a device for manufacturing a glass sheet capable of easily adjusting a shape dimension of a glass ribbon.

Means for Solving the Problems

In order to solve the above-mentioned problem, the present invention relates to a method for manufacturing a glass sheet, the method comprising:

running down molten glass along both side surfaces of a molded body;

joining and integrating the molten glass just under a lower edge part of the molded body; and drawing downward and molding an integrated sheet-shaped glass ribbon, wherein a guide member which contacts to an end in a width direction of a joined molten glass is provided, and a relative position and/or a relative angle between the guide member and a lower edge of the molded body is/are adjusted.

Also, the present invention relates to a device for manufacturing a glass sheet, comprising a molded body for joining and integrating molten glass run down along both side surfaces of the molded body just under a lower edge part, in which a sheet-shaped glass ribbon integrated by the molded body is drawn downward and molded, wherein the device comprises a guide member which contacts with an end in a width direction of a joined molten glass and is supported so that a position and/or an angle with respect to a lower edge of the molded body is/are adjustable.

Advantage of the Invention

According to the invention, a method and a device for manufacturing a glass sheet capable of easily adjusting a shape dimension of the glass ribbon can be provided.

MODE FOR CARRYING OUT THE INVENTION

A mode for carrying out the invention will hereinafter be described with reference to the drawings.

Figure 1:
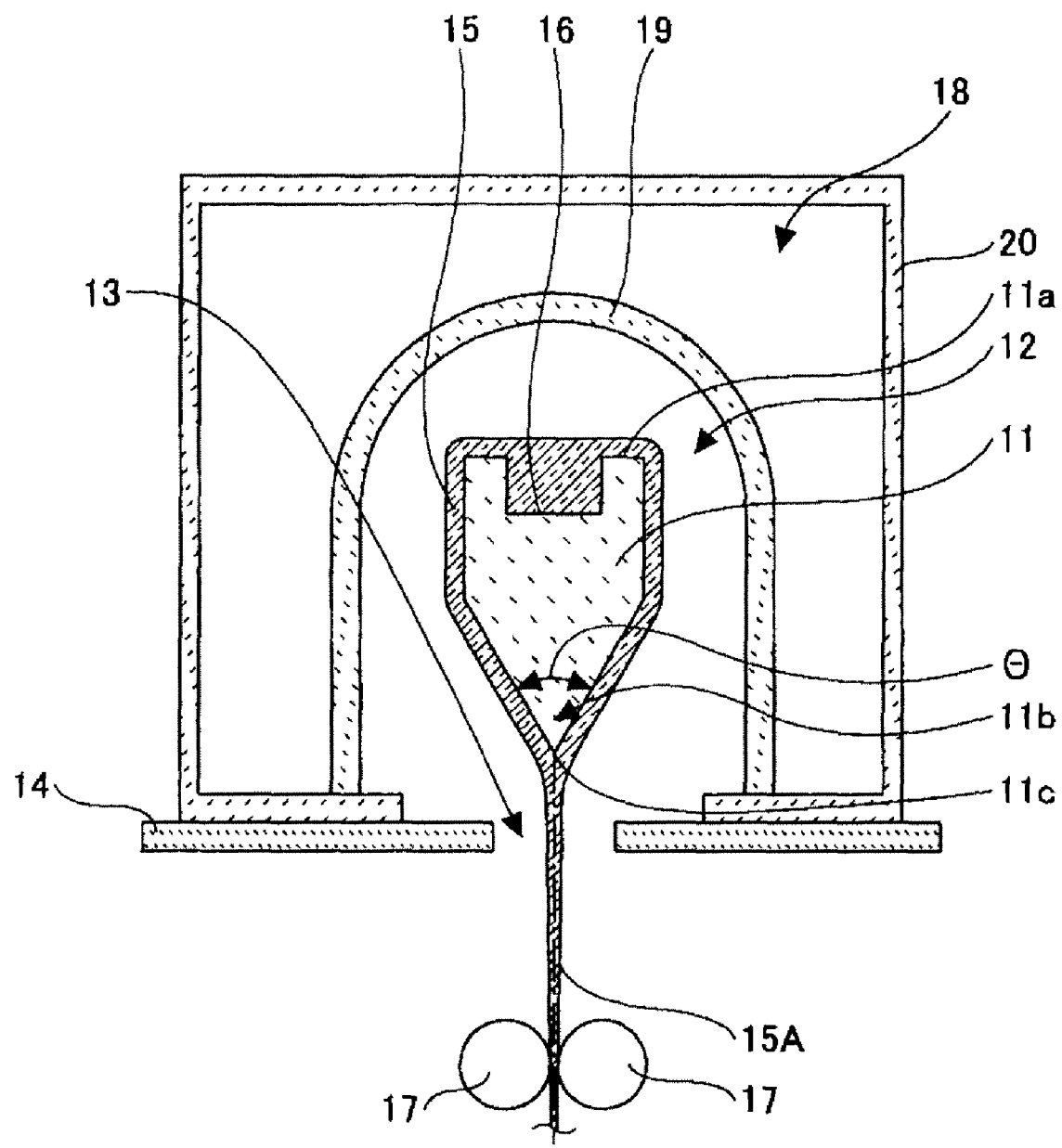
FIG. 1 is a sectional view showing a manufacturing device of a glass sheet according to one embodiment of the invention.
Figure 2:
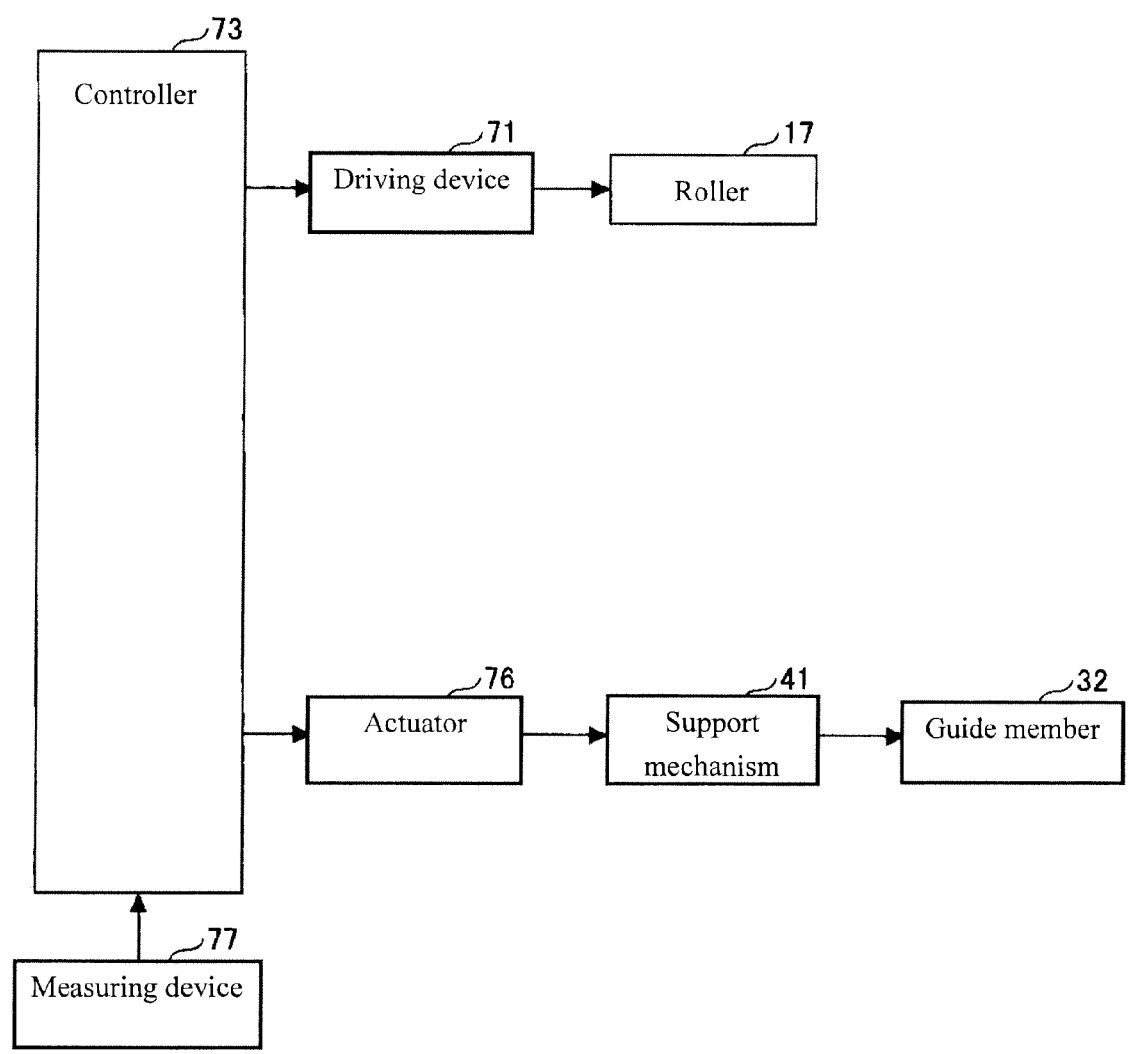
FIG. 2 is a functional block diagram showing a control system of the manufacturing device of the glass sheet of FIG. 1.

FIG. 1 is a sectional view showing a manufacturing device of a glass sheet which is one embodiment of the invention. FIG. 2 is a functional block diagram showing a control system of the manufacturing device of the glass sheet of FIG. 1.

The manufacturing device of the glass sheet has a molded body 11 for joining and integrating molten glass run down along both side surfaces just under a lower edge part, a molding chamber 12 in which the molded body 11 is arranged, and a molding chamber opening 13 for drawing downward a sheet-shaped glass ribbon integrated by the molded body 11 out of the molding chamber 12. The molding chamber opening 13 is formed by an opening member 14.

The molded body 11 is constructed of, for example, an alumina or zirconia refractory. The molded body 11 has a cross section of a wedge shape converging downward. A recess 16 for receiving molten glass 15 is formed in the upper portion of the molded body 11. A molten glass supply pipe (not shown) is connected to the recess 16. The molten glass 15 supplied from this molten glass supply pipe to the inside of the recess 16 spills from an upper edge (that is, the upper edge of the molded body 11) 11a of the recess 16 and runs down along both side surfaces of the molded body 11 and joins just under a lower edge part 11b of the molded body 11.

An angle θ between both side surfaces in the lower edge part 11b of the molded body 11 is preferably 15° to 36°. When the angle θ becomes larger than 36°, joining of the molten glass run down along both side surfaces becomes unstable. Particularly in the case of molding a thin glass sheet with an average thickness of 0.3 mm or less, it is necessary to draw thinly the joined molten glass 15 and stress applied to the joined molten glass 15 is great, so that when the angle θ becomes larger than 36°, joining of the molten glass 15 is strongly disturbed and it becomes difficult to mold the molten glass. Also, when the angle θ becomes larger than 36°, a transverse section of the molded body 11 becomes small and the strength of the molded body 11 decreases, so that the molded body 11 may be creep-deformed. On the other hand, when the angle θ becomes smaller than 15°, the lower edge part 11b may be damaged due to thermal stress when the molded body 11 is heated in the case of starting up the manufacturing device of the glass sheet.

The joined molten glass 15 forms a sheet-shaped glass ribbon 15A. The glass ribbon 15A is molded by drawing downward by a pair of rollers 17 rotated and driven by a driving device 71. A pair of rollers 17 is arranged by one set in both right and left sides of the glass ribbon 15A, and respectively pinches and draws downward the end in a width direction of the glass ribbon 15A. In addition, a pair of rollers 17 may be further arranged by plural sets in a vertical direction.

In the glass ribbon 15A after molding, both ends in the width direction of the glass ribbon 15A are cut off and the remaining center in the width direction is used as a glass sheet which is a product.

The molding chamber 12 is arranged inside a furnace chamber 18. The molding chamber 12 and the furnace chamber 18 are partitioned by a partition wall 19. The partition wall 19 is placed and fixed on a floor surface of a furnace wall 20 forming the furnace chamber 18. The partition wall 19 and the furnace wall 20 are constructed of a refractory.

Figure 3:
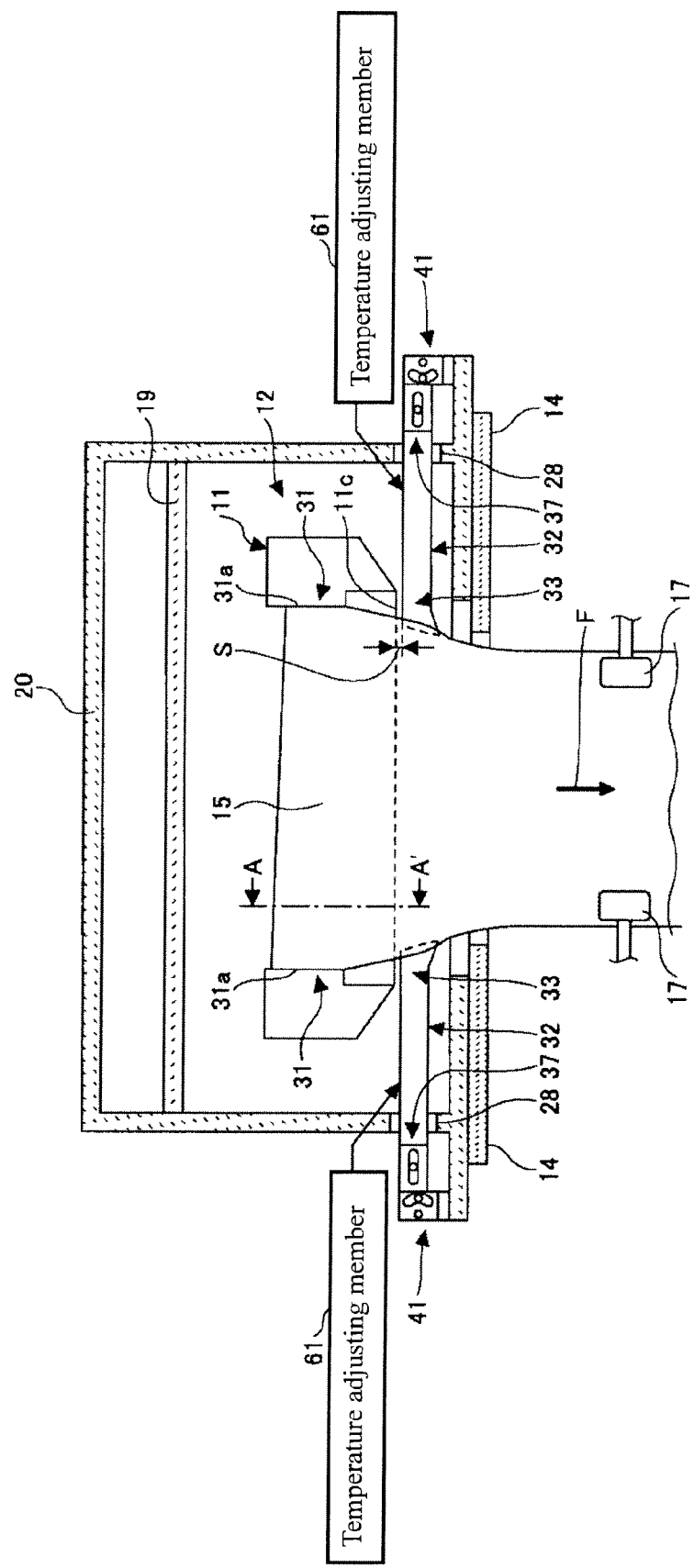
FIG. 3 is a partially cutaway side view showing a main part of the manufacturing device of the glass sheet of FIG. 1.

FIG. 3 is a partially cutaway side view showing a main part of the manufacturing device of the glass sheet of FIG. 1. In FIG. 3, a direction of arrow F shows a flow direction of the glass ribbon 15A.

Figure 4:
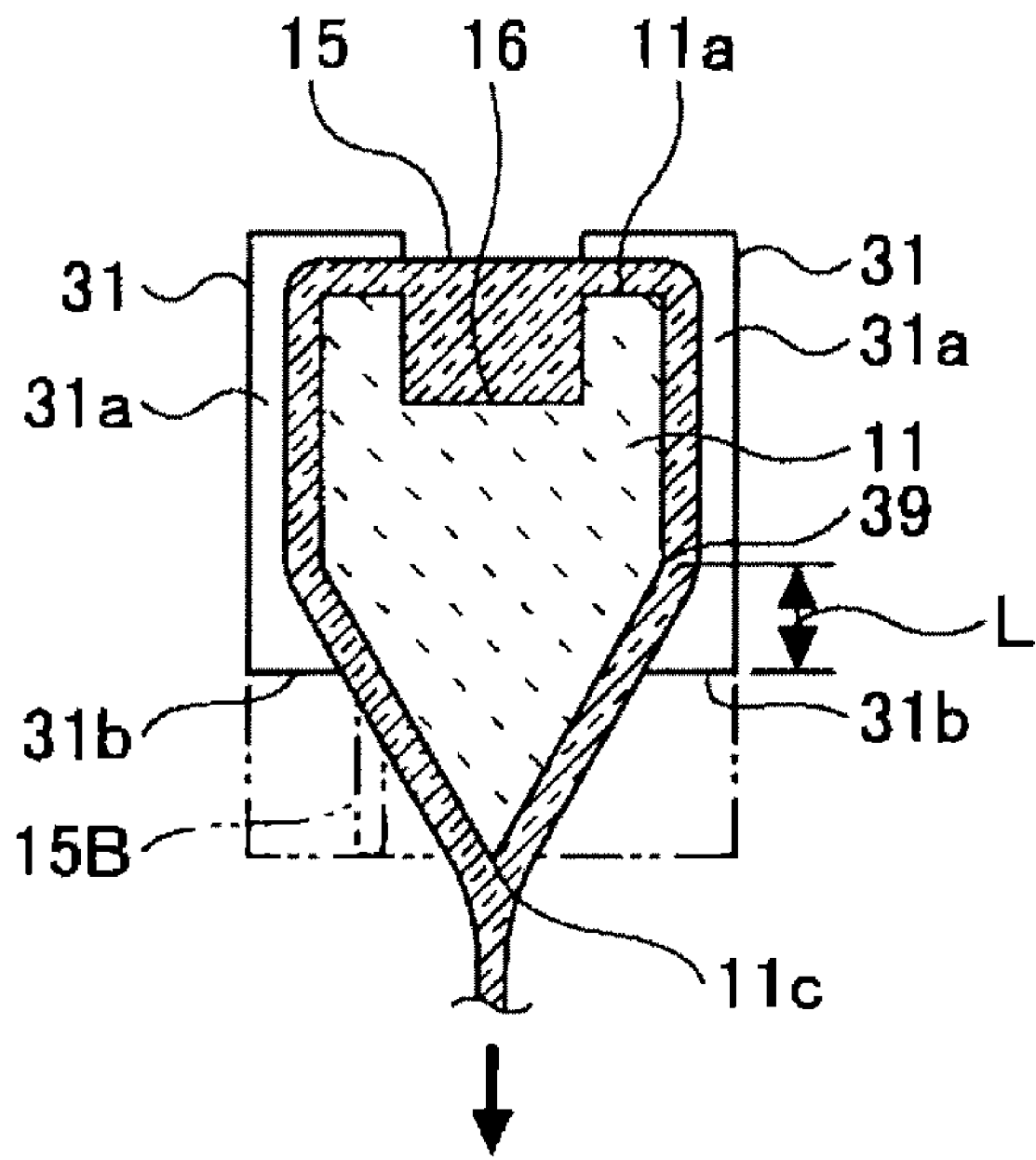
FIG. 4 is a sectional view taken along line A-A' of FIG. 3.

FIG. 4 is a sectional view taken along line A-A' of FIG. 3.

The manufacturing device of the glass sheet has a guide wall 31, a guide member 32, a support mechanism 41 and a temperature adjusting member 61 as shown in FIG. 3.

First, the guide wall 31 will be described.

The guide wall 31 is formed of, for example, an alumina, zirconia or zircon refractory. The guide walls 31 are respectively extended halfway from the upper edge 11a toward a lower edge 11c in the vicinities of both right and left ends of both side surfaces of the molded body 11.

After the molten glass 15 running down along the side surfaces of the molded body 11 expands to the guide walls 31 of both right and left sides and runs down while contacting with inner wall surfaces 31a of the guide walls 31 of both right and left sides, the molten glass 15 runs down away from the guide walls 31 of both right and left sides.

As the molten glass 15 runs down along the side surfaces of the molded body 11, the width of flow narrows by surface tension in a natural state. On the other hand, by providing the guide walls 31, the molten glass 15 running down contacts with the guide walls 31 and wets, so that the width of flow can be inhibited from contracting.

When the guide walls 31 are extended to the lower edge 11c of the molded body 11, a downward split flow 15B along the inner wall surfaces 31a of the guide walls 31 tends to occur as shown by a two-dot chain line in FIG. 4. In the embodiment, the guide walls 31 are not extended to the lower edge 11c of the molded body 11, so that occurrence of the split flow 15B can be inhibited.

A position of a lower edge 31b of the guide wall 31 is properly set according to a shape dimension of the molded body 11, a flow rate, viscosity, etc. of the molten glass 15. A vertical distance L (where the distance L is plus when the lower edge 31b of the guide wall 31 is in the lower side beyond a predetermined site 39 of the side surface of the molded body 11, and is minus when the lower edge 31b of the guide wall 31 is in the upper side beyond the predetermined site 39 of the side surface of the molded body 11) from the lower edge 31b of the guide wall 31 to the predetermined site 39 of the side surface of the molded body 11 is preferably −200 mm to 200 mm, more preferably −10 mm to 5 mm. Here, the predetermined site 39 of the side surface of the molded body 11 refers to an upper edge of a region in which the molten glass 15 is in contact from the lower side in the side surface of the molded body 11. When the distance L is larger than 200 mm, the split flow 15B tends to occur. When the distance L is smaller than −200 mm, the contraction width of flow by surface tension is too large.

Next, the guide member 32 will be described.

The guide member 32 is formed of high heat-resistant and corrosion-resistant materials, for example, ceramics or heat-resistant alloy. As the ceramics, for example, alumina, zirconia, zircon, silicon nitride, silicon carbide, boron nitride, or an alumina or zirconia refractory can be used. As the heat-resistant alloy, for example, iron-chromium alloy, nickel alloy or cobalt alloy can be used.

The guide members 32 are installed one by one in both right and left sides of the molten glass 15 joining just under the lower edge part 11b of the molded body 11. The joined molten glass 15 expands to distal ends 33 of the guide members 32 of both right and left sides and runs down in a state of contacting with the distal ends 33. As the molten glass 15 runs down, the width of flow narrows by surface tension in a natural state. On the other hand, by providing the guide members 32, the joined molten glass 15 contacts with the distal ends 33 of the guide members 32 and wets, so that the width of flow can be inhibited from narrowing.

A vertical spacing S between the distal end 33 of the guide member 32 and the lower edge 11c of the molded body 11 is preferably 30 mm or less. When the spacing S is larger than 30 mm, the width of flow contracts greatly as soon as the molten glass 15 separates from the lower edge part 11b of the molded body 11. In addition, the distal end 33 of the guide member 32 may contact with the lower edge part 11b of the molded body 11 as long as the relative position and/or angle can be changed.

Figure 5:
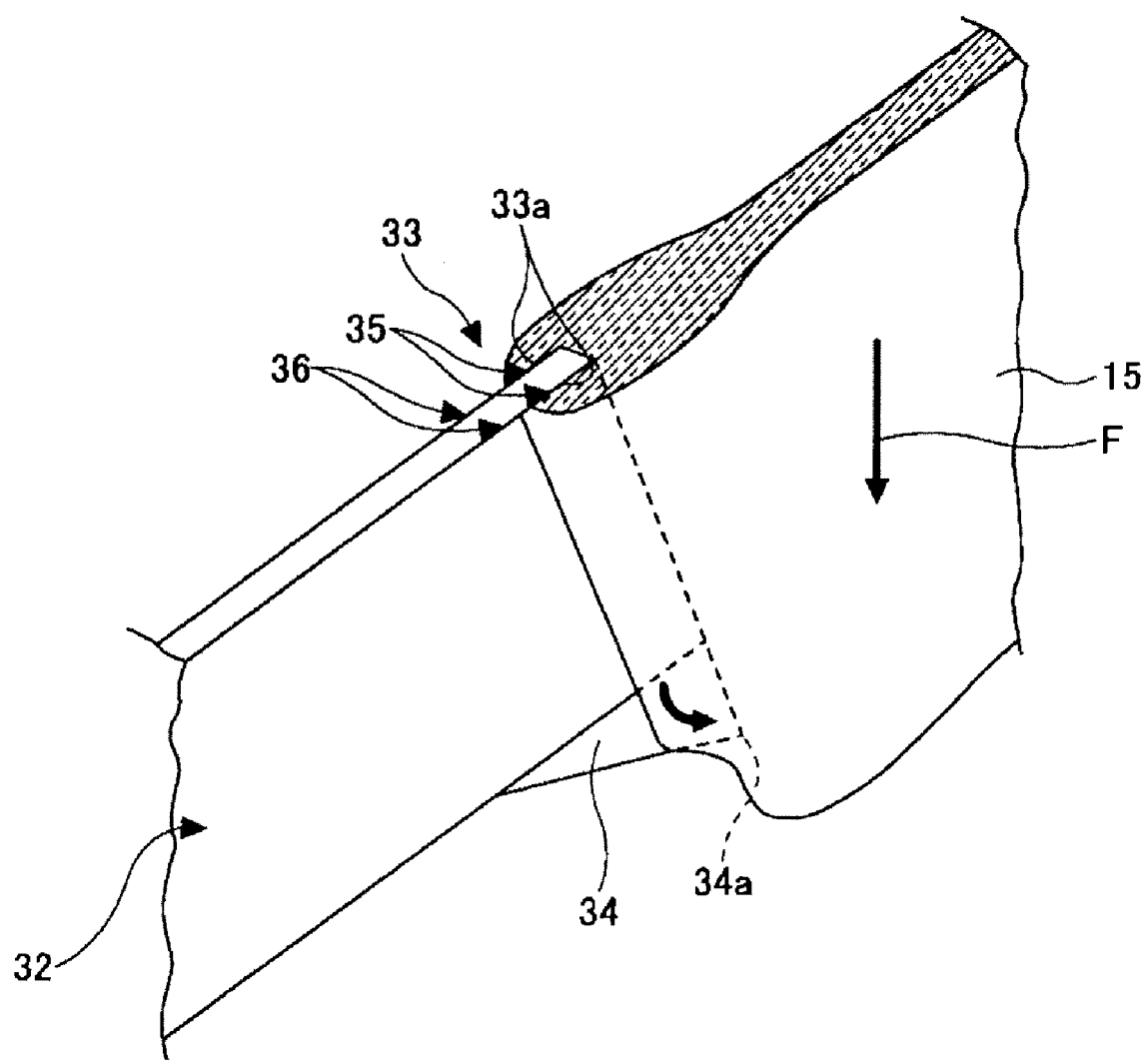
FIG. 5 is a perspective view showing a positional relation between molten glass 15 and a distal end 33 of a guide member 32.

FIG. 5 is a perspective view showing a positional relation between the joined molten glass 15 and the distal end 33 of the guide member 32.

In an example shown in FIG. 5, the guide member 32 is formed in a long flat plate shape. The end in the width direction of the joined molten glass 15 runs down while contacting with both side surfaces 33a of the distal end 33 of the guide member 32. As a result, the molten glass 15 is resistant to separating from the distal end 33 of the guide member 32 when the flow of the molten glass 15 is disturbed and its width narrows.

A taper-shaped protrusion 34 projecting downward is formed integrally to the distal end 33 of the guide member 32. As the end in the width direction of the joined molten glass 15 runs down, the end in the width direction moves toward a lower end 34a of the triangular plate-shaped protrusion 34 and separates from the protrusion 34 in the vicinity of the lower end 34a of the protrusion 34.

When the protrusion 34 is not formed, the molten glass 15 in contact with the guide member 32 may slip in a longitudinal direction of the guide member 32 when the molten glass 15 separates from the guide member 32. As a result, the flow of the molten glass 15 tends to become unstable.

In addition, in the example shown in FIG. 5, the protrusion 34 has the triangular plate shape, but may have a triangular pyramid shape. In short, the protrusion 34 has only to have the taper shape projecting downward.

A surface of the distal end 33 of the guide member 32 may have a first region 35 which contacts with the molten glass 15 and wets, n and a second regio 36 in which the molten glass 15 is more resistant to wetting than the first region 35 as shown in FIG. 5. The first region 35 is set to the distal end side beyond the second region 36. Consequently, the molten glass 15 in contact with the guide member 32 can be inhibited from slipping in the longitudinal direction of the guide member 32, and the flow of the molten glass 15 can be stabilized.

A method for forming the first and second regions 35, 36 with different wettability includes a method for forming a thin film with wettability lower than that of the guide member 32 on a part of the surface of the distal end 33 of the guide member 32. For example, slurry of boron nitride with wettability lower than that of alumina is applied to a part of the surface of the distal end 33 of the guide member 32 made of alumina and is dried to form the thin film with lower wettability.

Other methods include, for example, a method for forming a thin film with wettability higher than that of the guide member 32 on a part of the surface of the distal end 33 of the guide member 32, a method for coupling two members with different wettability, or a method for surface-treating a part of the guide member 32 by plasma.

As other materials with high wettability, platinum, platinum group alloy, reinforced platinum, reinforced platinum alloy, etc. are given, and as materials with low wettability, nitride-based ceramics, silicon nitride-boron nitride composite material, gold or gold-containing alloy, carbon-based material such as carbon or graphite, nitride-carbide composite material, etc. are given.

As shown in FIG. 3, the guide member 32 is inserted into the molding chamber 12 from an opening 28 of the furnace wall 20 and has a configuration replaceable without demolishing the partition wall 19 or the furnace wall 20. It is necessary to stop manufacture of the glass sheet for a long time in the case of demolishing the partition wall 19 or the furnace wall 20.

The guide member 32 is supported by the support mechanism 41 so that a position and/or an angle with respect to the lower edge 11c of the molded body 11 is/are adjustable.

Figure 6:
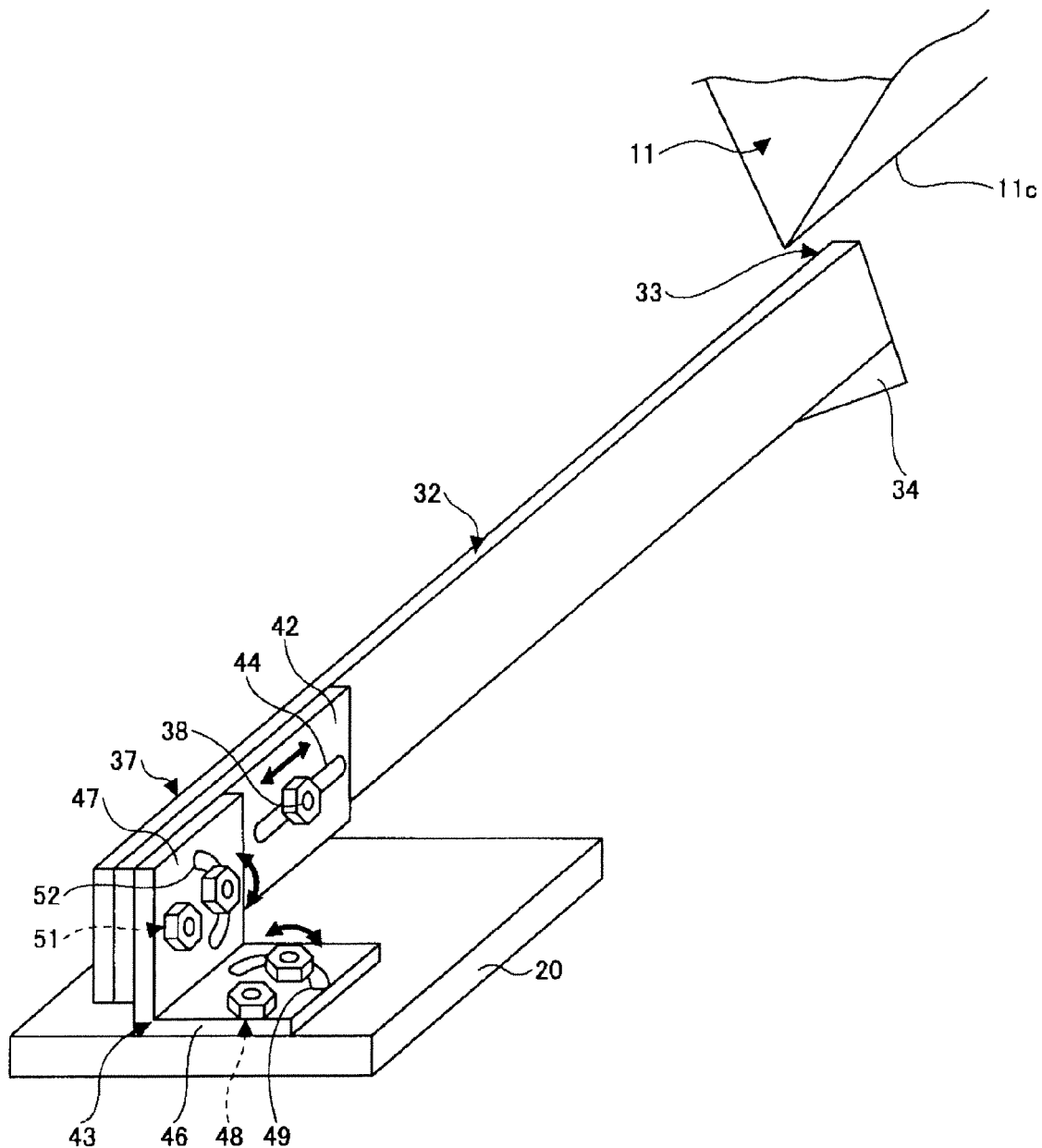
FIG. 6 is a perspective view describing a configuration and an operation of a support mechanism 41.

Next, the support mechanism 41 will be described with reference to FIGS. 3 and 6.

The support mechanism 41 is a mechanism for supporting the guide member 32 so as to be able to adjust a position and/or an angle with respect to the lower edge 11c of the molded body 11. The support mechanism 41 is provided in the vicinity of the opening 28 of the furnace wall 20.

For example, the support mechanism 41 includes a first support member 42 for slidably supporting a proximal end 37 of the guide member 32 in a longitudinal direction of the guide member 32, and a second support member 43 for pivotally supporting the first support member 42 in a vertical direction and a horizontal direction with respect to the furnace wall 20.

The first support member 42 is formed of a metal material such as stainless steel, and is not particularly limited to its material. A linear guide hole 44 is formed in the first support member 42. A screw part 38 of the guide member 32 is inserted into the guide hole 44. The first support member 42 is fastened to the screw part 38 by a nut.

The second support member 43 is formed of a metal material such as stainless steel, and is not particularly limited to its material. The second support member 43 is formed in an L shape and is configured to integrally form a horizontal plate part 46 and a vertical plate part 47.

A pivotal support hole 48 and a circularly arcuate cam hole 49 around the pivotal support hole 48 are formed in the horizontal plate part 46. Screw parts fixed to the furnace wall 20 are respectively inserted into the pivotal support hole 48 and the cam hole 49. The horizontal plate part 46 is fastened to these screw parts by nuts.

A pivotal support hole 51 and a circularly arcuate cam hole 52 around the pivotal support hole 51 are formed in the vertical plate part 47. Screw parts projected on the first support member 42 are inserted into the pivotal support hole 51 and the cam hole 52. The vertical plate part 47 is fastened to these screw parts by nuts.

In the support mechanism 41 configured as described above, each of the nuts is loosened manually and the first support member 42 is turned in the horizontal direction and the vertical direction with respect to the furnace wall 20 and an angle is adjusted. Also, the guide member 32 is slid with respect to the first support member 42 and a position is adjusted. Consequently, the relative position and/or angle between the guide member 32 and the lower edge 11c of the molded body 11 can be adjusted. After adjustment, each of the nuts is tightened and the position and/or angle is/are fixed.

In addition, in the embodiment, the relative position and/or angle between the guide member 32 and the lower edge 11c of the molded body 11 is/are adjusted manually, but the invention is not limited to this. That is, the relative position and/or angle between the guide member 32 and the lower edge 11c of the molded body 11 may be adjusted automatically by driving the support mechanism 41 by an actuator 76 (see FIG. 2) such as an oil hydraulic cylinder, an air cylinder or a motor.

Next, adjustment of the relative position and/or angle between the guide member 32 and the lower edge 11c of the molded body 11 will be described.

The relative position and/or angle between the guide member 32 and the lower edge 11c of the molded body 11 is adjusted so that the glass ribbon 15A after molding has a desired shape dimension. The right and left guide members 32, 32 may be adjusted symmetrically or asymmetrically.

For example, the relative position and/or angle between the guide member 32 and the lower edge 11c of the molded body 11 is adjusted based on an average thickness of the glass sheet taken out of the center in the width direction of the glass ribbon 15A after molding. When a flow rate of the molten glass 15 is constant, as the average thickness of the glass sheet becomes thin, it is necessary to draw the joined molten glass 15 more thinly, and stress applied to the joined molten glass 15 increases. Hence, the distal ends 33 of the guide members 32 of the right and left sides are inward moved so that the ends in the width direction of the joined molten glass 15 can surely be supported as the average thickness of the glass sheet becomes thin.

Also, when a longitudinal wrinkle is formed along a longitudinal direction in the end in the width direction of the glass ribbon 15A after molding, the guide member 32 in contact with the end in the width direction is turned in the vertical direction and the angle is adjusted. Consequently, the flow of the inside of the end in the width direction of the joined molten glass 15 can be adjusted and formation of subsequent longitudinal wrinkles can be avoided.

Further, when the end in the width direction of the glass ribbon 15A after molding warps, the guide member 32 in contact with the end in the width direction is turned in the horizontal direction and the angle is adjusted. Consequently, the position of the end in the width direction of the joined molten glass 15 can be adjusted and occurrence of subsequent warps can be avoided.

Also, by repeating adjustment of the position and/or angle between the guide member 32 and the lower edge 11c of the molded body 11 and measurement of a shape dimension of the glass sheet manufactured after the adjustment, the manufactured glass sheet can be formed in a desired shape dimension. The shape dimension of the glass sheet manufactured after the adjustment is measured by a measuring device 77 (see FIG. 2).

In addition, the measuring device 77 may be connected to a controller 73. In this case, when the controller 73 receives a measured result from the measuring device 77, the controller 73 drives the support mechanism 41 by the actuator 76 so that the glass sheet manufactured from now is formed in the desired shape dimension, and adjusts the position and/or angle between the guide member 32 and the lower edge 11c of the molded body 11.

Incidentally, the proper position and/or angle between the guide member 32 and the lower edge 11c of the molded body 11 tends to vary depending on molding conditions. This tendency is remarkable as an average thickness of the glass sheet becomes thin, and is particularly remarkable since rigidity of the glass sheet becomes low when the average thickness of the glass sheet is 0.3 mm or less.

Here, the molding conditions refer to conditions of molding the glass sheet, and include, for example, states of components (the molded body 11, the partition wall 19, a heating element, etc.) constructing the manufacturing device of the glass sheet in addition to composition or average thickness of the glass sheet, a force by which the glass ribbon 15A is drawn downward, thickness of the end in the width direction, temperature distribution or conveyance speed of the glass ribbon 15A.

On the other hand, in this embodiment, by adjusting the relative position and/or angle between the guide member 32 and the lower edge 11c of the molded body 11, a change in the molding conditions can be handled easily and the glass sheet with a desired dimension shape can be obtained. This effect is remarkable when the average thickness of the glass sheet is 0.3 mm or less. Also, this effect is remarkable when the guide wall 31 is not extended to the lower edge 11c of the molded body 11.

Next, the temperature adjusting member 61 will be described.

The temperature adjusting member 61 is a member for adjusting a temperature of the guide member 32. Temperature distribution, viscosity distribution (and thus a shape dimension) of the molten glass 15 in contact with the guide member 32 can be adjusted by adjusting the temperature of the guide member 32.

A member for heating the guide member 32 includes an internal heater embedded in the distal end 33 of the guide member 32, and an external heater for heating the proximal end 37 of the guide member 32 from the outside. In the case of using the internal heater, the distal end 33 can be heated efficiently. In the case of using the external heater, replacement and repair are facilitated. In the case of using the external heater, a material of the guide member 32 desirably has high thermal conductivity.

A member for cooling the guide member 32 includes a refrigerant supply device for feeding a refrigerant to the inside of the guide member 32, and a refrigerant supply device for spraying a refrigerant on the proximal end 37 of the guide member 32 from the outside. In the case of feeding the refrigerant to the inside, the distal end 33 of the guide member 32 can be cooled efficiently. In the case of spraying the refrigerant from the outside, replacement and repair are facilitated. In the case of spraying the refrigerant from the outside, a material of the guide member 32 desirably has high thermal conductivity.

According to this embodiment as described above, the position and/or angle between the guide member 32 and the lower edge 11c of the molded body 11 is/are adjusted, so that a shape of the glass ribbon 15A can be adjusted easily. Consequently, a change in the molding conditions can be handled easily and the glass sheet with a desired shape dimension can be obtained.

Figure 7:
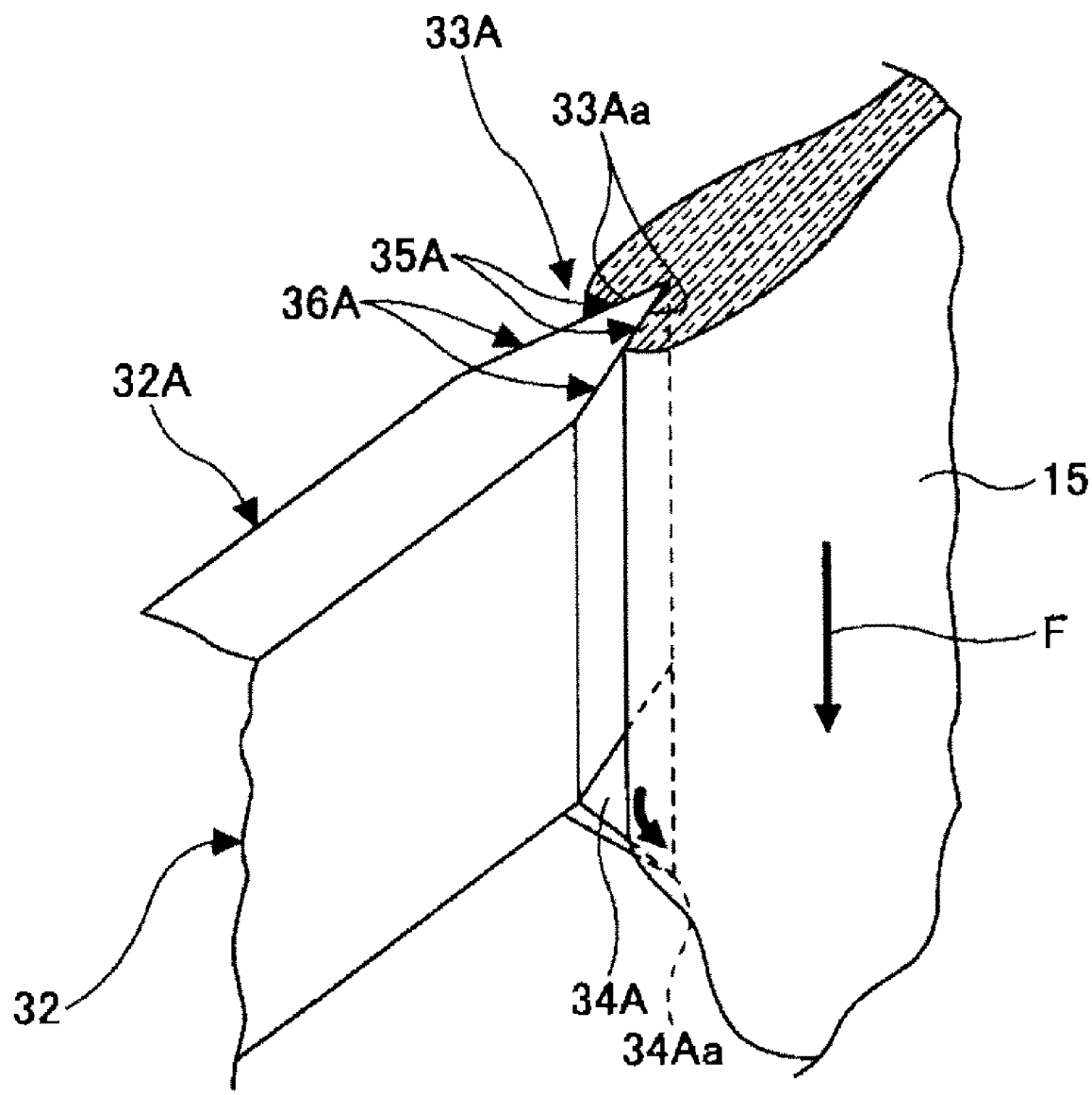
FIG. 7 is a perspective view showing a modified example of FIG. 5.

FIG. 7 is a perspective view showing a modified example of FIG. 5.

In the modified example shown in FIG. 7, a distal end 33A of a guide member 32A is formed in a cross section of a wedge shape converging toward the distal end. Also in this case, like the case of FIG. 5, the end in the width direction of the joined molten glass 15 runs down while contacting with both side surfaces 33Aa of the distal end 33A of the guide member 32A. As a result, like the case of FIG. 5, the molten glass 15 is resistant to separating from the distal end 33A of the guide member 32A when the flow of the molten glass 15 is disturbed and its width narrows.

A taper-shaped protrusion 34A projecting downward is formed integrally to the distal end 33A of the guide member 32A like the case shown in FIG. 5. As the end in the width direction of the joined molten glass 15 runs down, the end in the width direction moves toward a lower end 34Aa of the triangular pyramid-shaped protrusion 34A and separates from the protrusion 34A in the vicinity of the lower end 34Aa of the protrusion 34A. As a result, the flow of the molten glass 15 tends to become stabilized like the case shown in FIG. 5.

A surface of the distal end 33A of the guide member 32A may have a first region 35A which contacts with the molten glass 15 and wets, and a second region 36A in which the molten glass 15 is more resistant to wetting than the first region 35A like the case shown in FIG. 5. Consequently, like the case shown in FIG. 5, the molten glass 15 in contact with the guide member 32A can be inhibited from slipping in the longitudinal direction of the guide member 32A, and the flow of the molten glass 15 can be stabilized.

Figure 8:
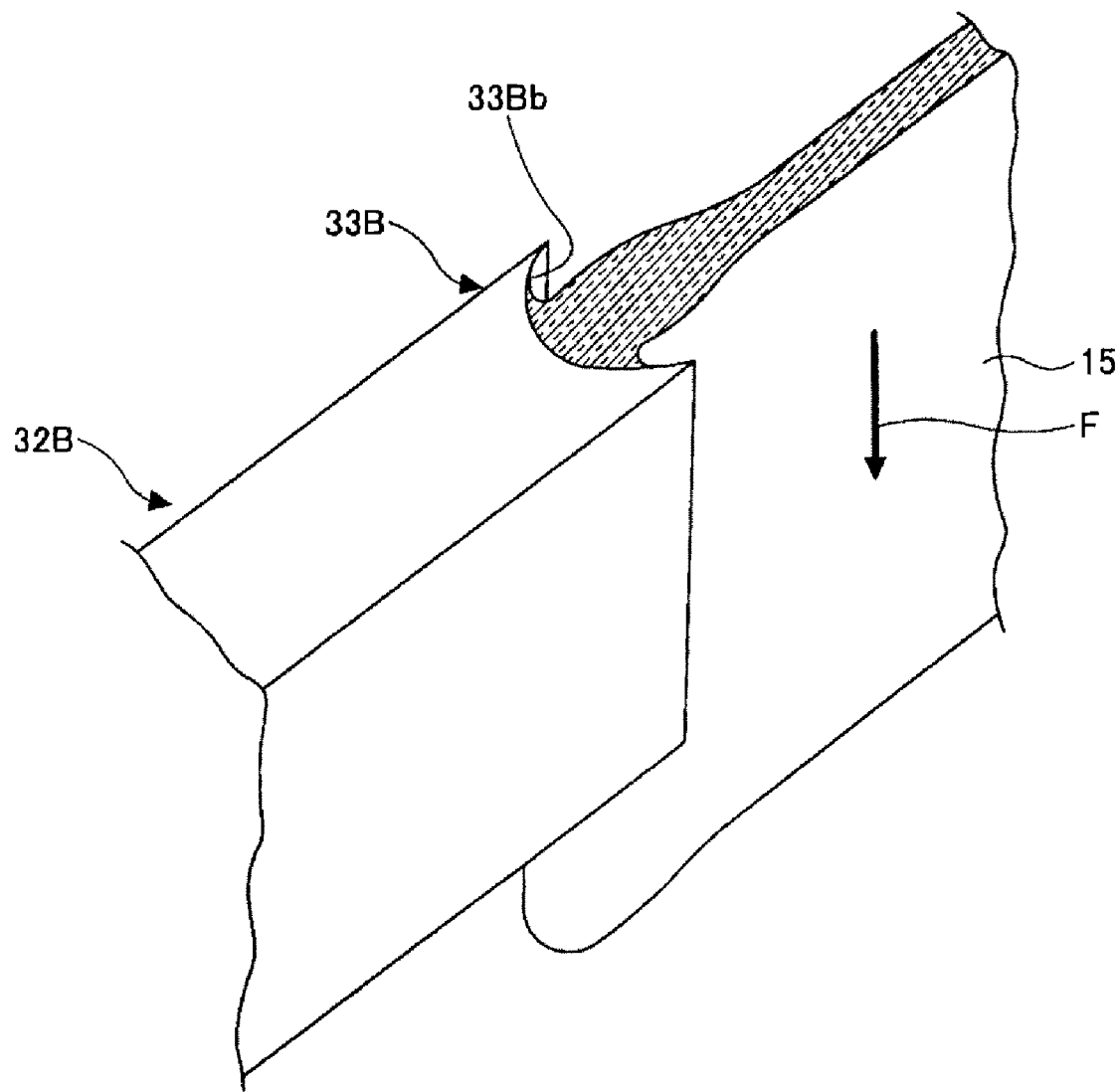
FIG. 8 is a perspective view showing another modified example of FIG. 5.

FIG. 8 is a perspective view showing another modified example of FIG. 5.

In the modified example shown in FIG. 8, an end face in the width direction of the joined molten glass 15 runs down while contacting with a distal end face 33Bb in a distal end 33B of a guide member 32B. As a result, a situation in which the flow of the molten glass 15 is disturbed and its width varies can be inhibited by the distal end face 33Bb of the guide member 32B.

When the flow of the molten glass 15 is disturbed and its width varies, a shape dimension of the end in the width direction of the glass ribbon 15A becomes irregular, so that the end in the width direction of the glass ribbon 15A may break when the end in the width direction is pinched by a pair of rollers 17.

A cross-sectional shape at the time of viewing the distal end face 33Bb of the guide member 32B from a flow direction F of the glass ribbon 15A is formed in a circularly arcuate concave curved surface. In other words, in the distal end face 33Bb of the guide member 32B, a shape in a cross section orthogonal to a vertical direction is formed in the circularly arcuate concave curved surface. Consequently, the molten glass 15 is resistant to separating from the distal end face 33Bb when the flow of the molten glass 15 is disturbed and its width narrows.

In addition, the distal end face 33Bb of the guide member 32B may be formed in a flat surface. Also in this case, the molten glass 15 is relatively resistant to separating from the distal end face 33Bb.

When the cross-sectional shape at the time of viewing the distal end face 33Bb of the guide member 32B from the flow direction F of the glass ribbon 15A is formed in a circularly arcuate convex curved surface, the molten glass 15 tends to slip and separate from the distal end face 33Bb when the flow of the molten glass 15 is disturbed and its width narrows.

Figure 9:
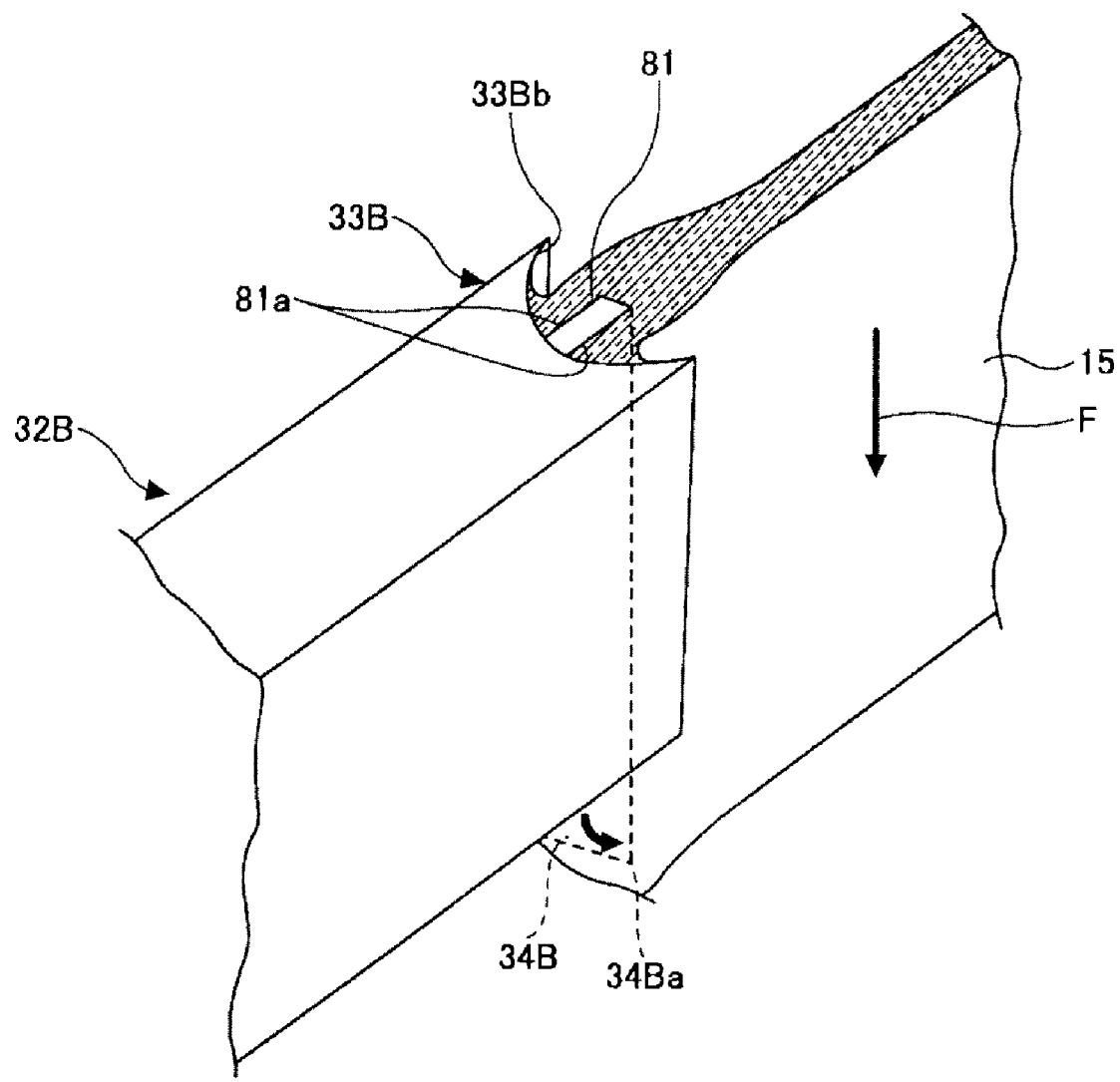
FIG. 9 is a perspective view showing a modified example of FIG. 8.

FIG. 9 is a perspective view showing a modified example of FIG. 8.

In the modified example shown in FIG. 9, a convex part 81 is formed integrally to the distal end face 33Bb of the guide member 32B shown in FIG. 8, and the end in the width direction of the joined molten glass 15 runs down while contacting with both side surfaces 81a of the convex part 81. As a result, like the case shown in FIG. 5, the molten glass 15 is resistant to separating from the convex part 81 when the flow of the molten glass 15 is disturbed and its width narrows.

A taper-shaped protrusion 34B projecting downward is formed integrally to the convex part 81. As the end in the width direction of the joined molten glass 15 runs down, the end in the width direction moves toward a lower end 34Ba of the triangular plate-shaped protrusion 34B and separates from the protrusion 34B in the vicinity of the lower end 34Ba of the protrusion 34B. As a result, the flow of the molten glass 15 tends to become stabilized.

In addition, in the example shown in FIG. 9, the protrusion 34B has the triangular plate shape, but may have a triangular pyramid shape. In short, the protrusion 34B has only to have the taper shape projecting downward.

Figure 10:
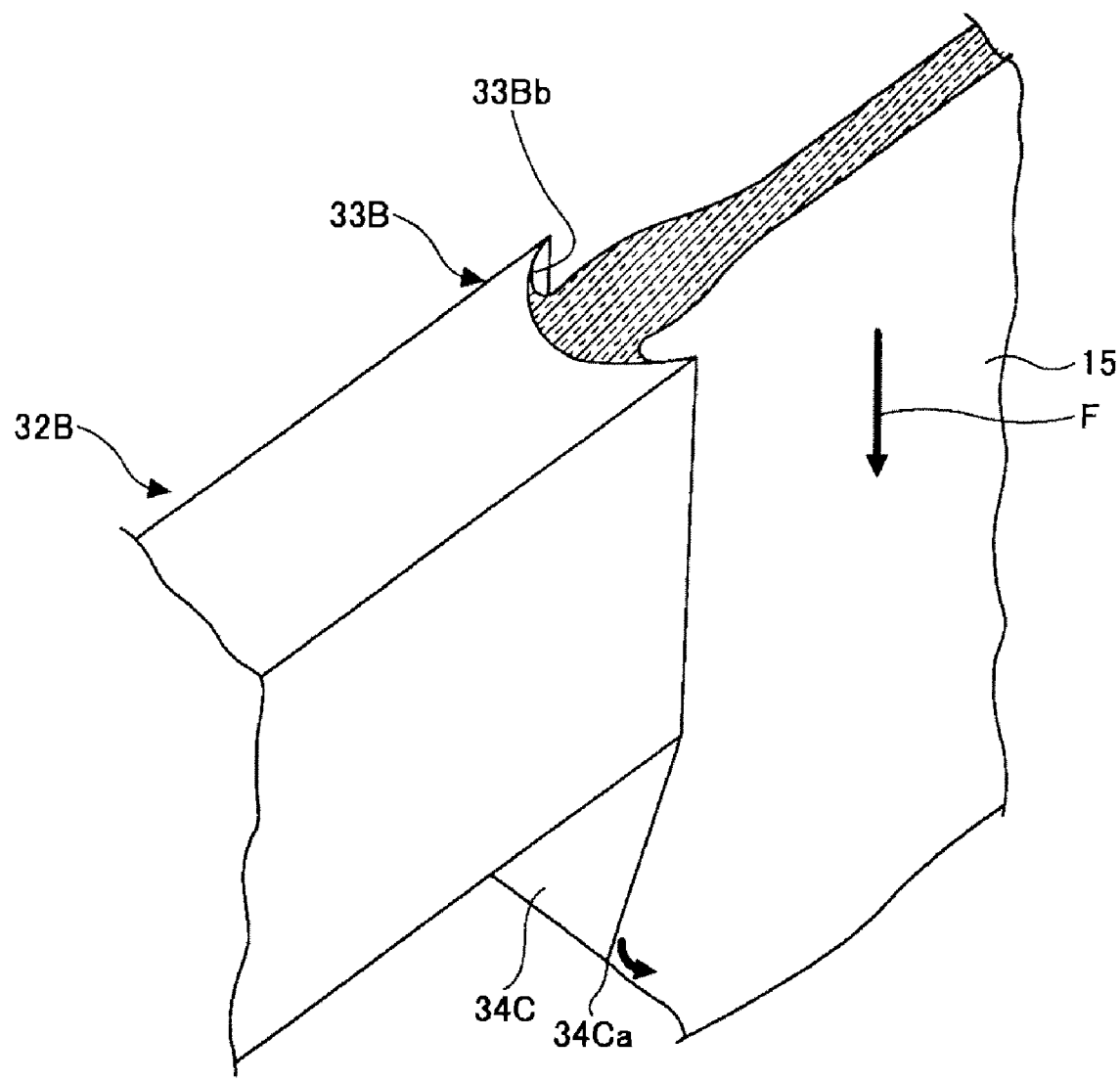
FIG. 10 is a perspective view showing another modified example of FIG. 8.
Figure 11A:
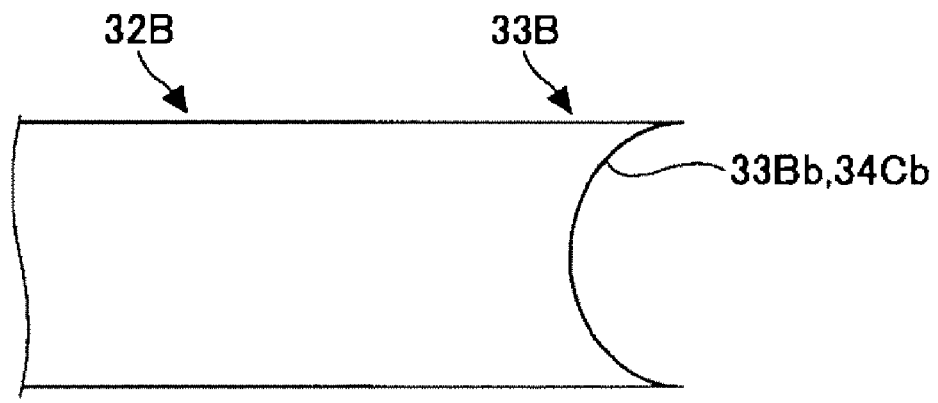
FIG. 11A is a top view showing a distal end 33B of a guide member 32B of FIG. 10 and the periphery of the distal end.
Figure 11B:
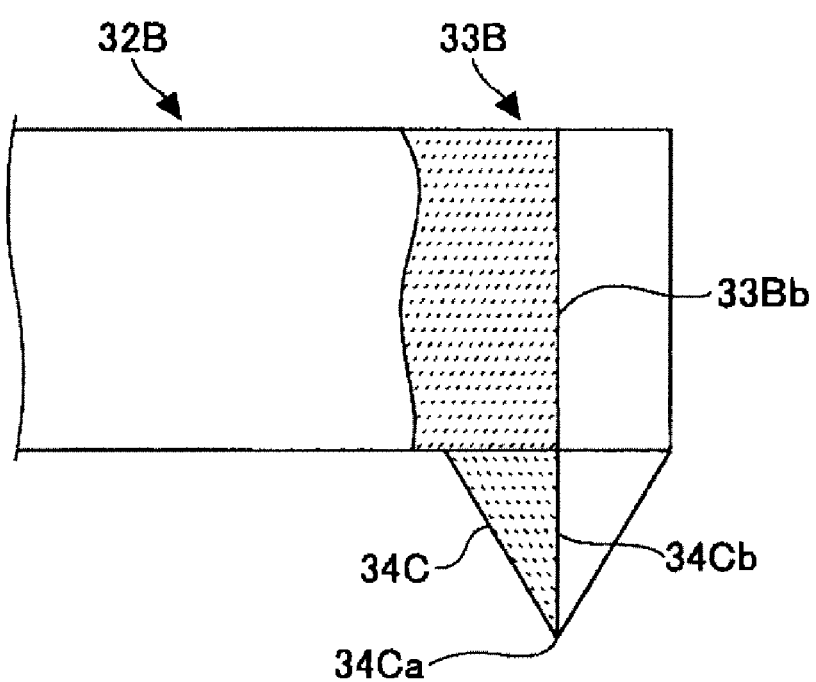
FIG. 11B is a partially sectional side view showing the distal end 33B of the guide member 32B of FIG. 10 and the periphery of the distal end.
Figure 11C:
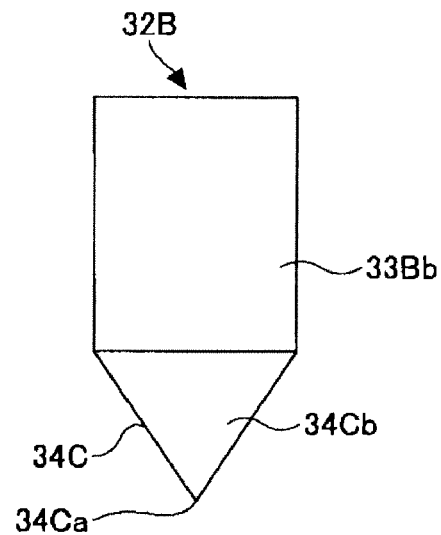
FIG. 11C is a front view showing the distal end 33B of the guide member 32B of FIG. 10 and the periphery of the distal end.
Figure 11D:
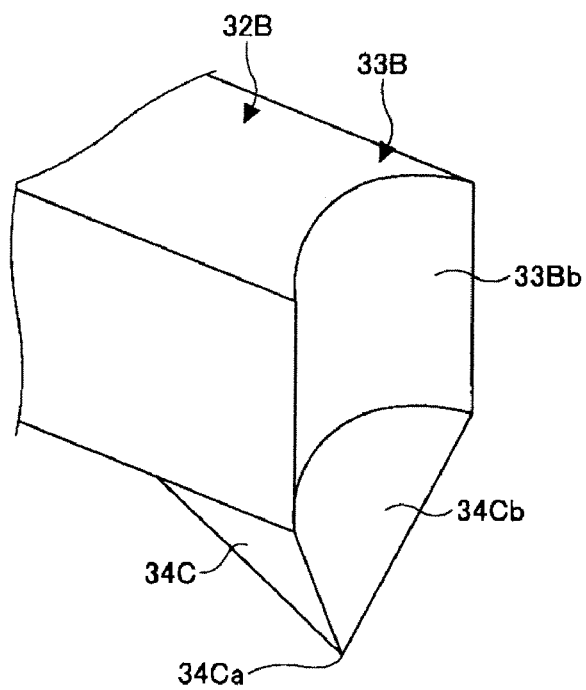
FIG. 11D is a perspective view showing the distal end 33B of the guide member 32B of FIG. 10 and the periphery of the distal end.

FIG. 10 is a perspective view showing another modified example of FIG. 8. FIGS. 11A to 11D are views showing a distal end 33B of a guide member 32B of FIG. 10 and the periphery of the distal end, and FIG. 11A is a top view, and FIG. 11B is a partially sectional side view, and FIG. 11C is a front view, and FIG. 11D is a perspective view.

In the modified example shown in FIG. 10, a taper-shaped protrusion 34C projecting downward is formed integrally to the distal end 33B of the guide member 32B shown in FIG. 8. This protrusion 34C has a side surface 34Cb with a shape (a circularly arcuate concave curved surface in cross-sectional view) in which a shape of the distal end face 33Bb is extended in a longitudinal direction of the distal end face 33Bb. An end face in the width direction of the molten glass 15 runs down while contacting with the side surface 34Cb.

As the end in the width direction of the joined molten glass 15 runs down, the end in the width direction moves toward a lower end 34Ca of the protrusion 34C and separates from the protrusion 34C in the vicinity of the lower end 34Ca of the protrusion 34C. As a result, the flow of the molten glass 15 tends to become stabilized.

Figure 12:
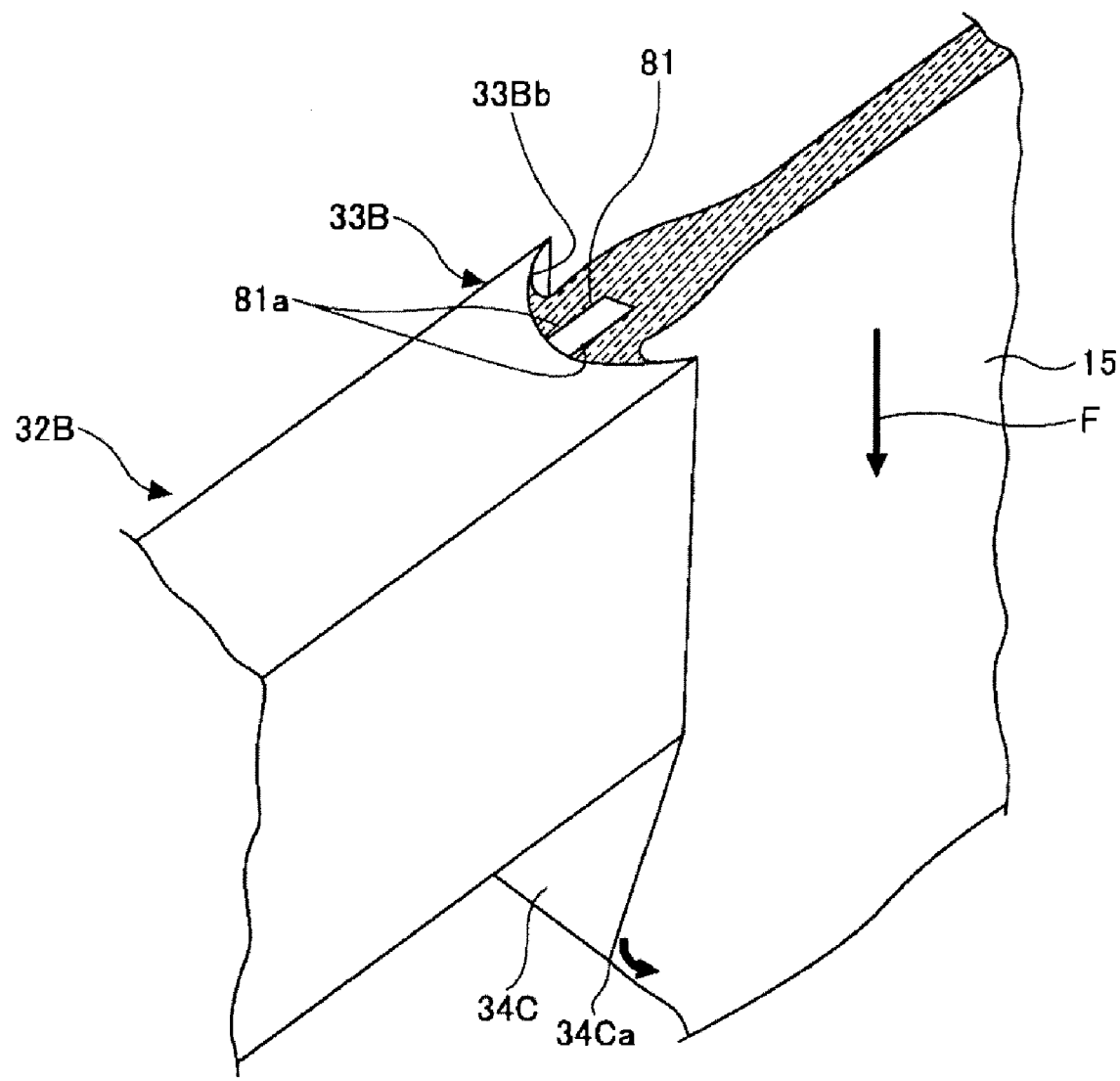
FIG. 12 is a perspective view showing a further modified example of FIG. 8.
Figure 13A:
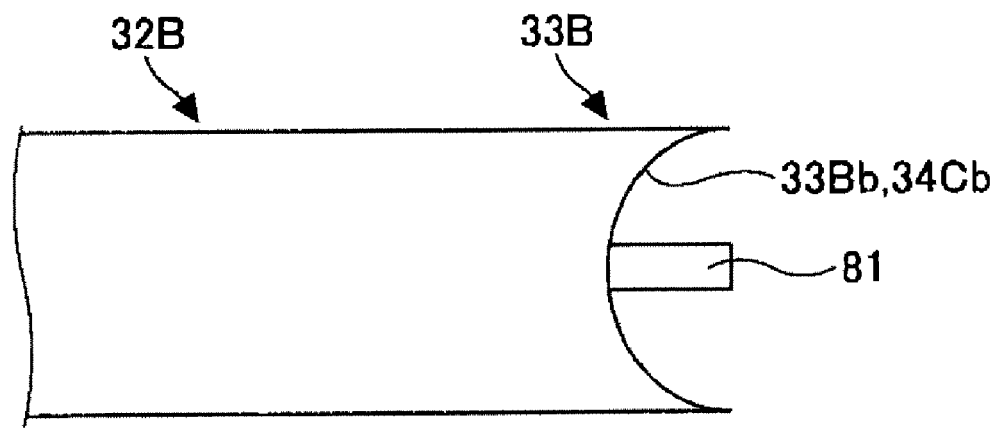
FIG. 13A is a top view showing a distal end 33B of a guide member 32B of FIG. 12 and the periphery of the distal end.
Figure 13B:
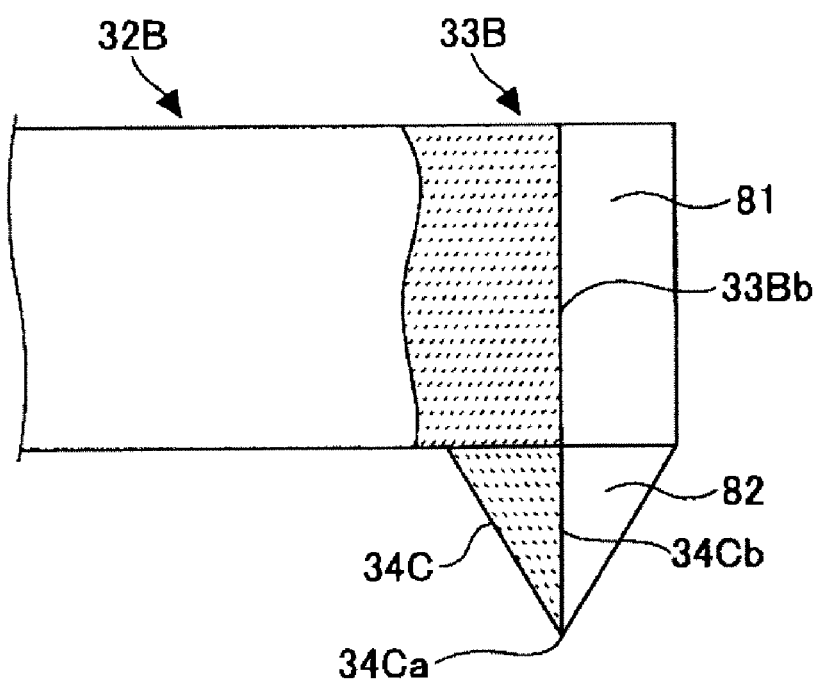
FIG. 13B is a partially sectional side view showing the distal end 33B of the guide member 32B of FIG. 12 and the periphery of the distal end.
Figure 13C:
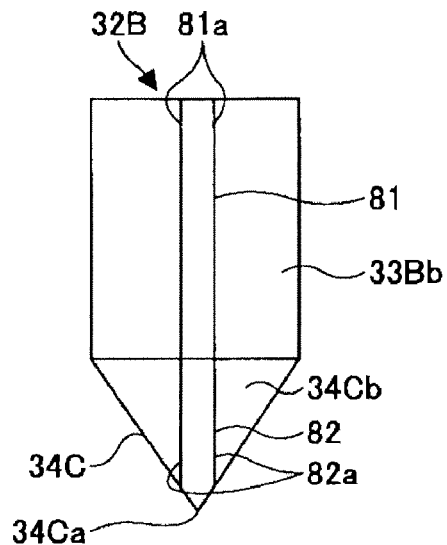
FIG. 13C is a front view showing the distal end 33B of the guide member 32B of FIG. 12 and the periphery of the distal end.
Figure 13D:
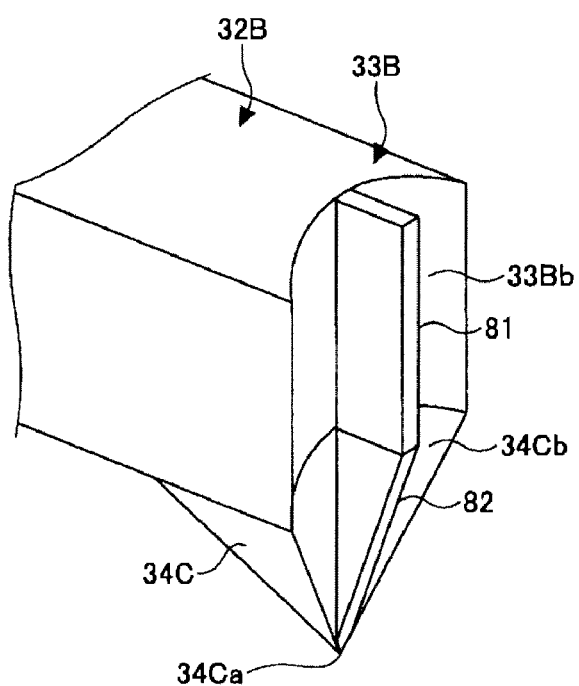
FIG. 13D is a perspective view showing the distal end 33B of the guide member 32B of FIG. 12 and the periphery of the distal end.

FIG. 12 is a perspective view showing a further modified example of FIG. 8. FIGS. 13A to 13D are views showing a distal end 33B of a guide member 32B of FIG. 12 and the periphery of the distal end, and FIG. 13A is a top view, and FIG. 13B is a partially sectional side view, and FIG. 13C is a front view, and FIG. 13D is a perspective view.

In the modified example shown in FIG. 12, a protrusion 82 in addition to the convex part 81 of FIG. 9 and the protrusion 34C of FIG. 10 is formed integrally to the distal end 33B of the guide member 32B shown in FIG. 8. This protrusion 82 has a triangular shape in side view, and is fixed with two sides of the protrusion 82 in contact with a lower surface of the convex part 81 and the side surface 34Cb of the protrusion 34C. The protrusion 82 may have, for example, a triangular plate shape as shown in FIG. 13D or a triangular pyramid shape. In short, the protrusion 82 has only to have the taper shape projecting downward.

The end in the width direction of the molten glass 15 runs down while contacting with both side surfaces 82a of this protrusion 82. As a result, the molten glass 15 is resistant to separating from the protrusion 82 when the flow of the molten glass 15 is disturbed and its width narrows. Also, as the end in the width direction of the molten glass 15 runs down, the end in the width direction moves toward a lower end 34Ca of the protrusion 34C and separates from the protrusion 34C and the protrusion 82 in the vicinity of the lower end 34Ca of the protrusion 34C. As a result, the flow of the molten glass 15 tends to become stabilized.

The embodiment of the invention has been described above in detail, but the invention is not limited to the embodiment described above, and various modifications and replacements can be made in the embodiment described above without departing from the scope of the invention.

For example, in the embodiment described above, the guide wall 31 is extended halfway from the upper edge 11a toward the lower edge 11c of the molded body 11, but may be extended to the lower edge 11c as long as the distance L is within the range described above, or depending on a shape of the guide wall 31 or the molded body 11.

Also, in the embodiment described above, the guide member 32, 32A, 32B is integrally formed in the longitudinal direction, but may be divided into plural members in the longitudinal direction as long as the relative position and/or angle between the guide member and the lower edge 11c of the molded body 11 can be adjusted.

Also, in the embodiment described above, the proximal end 37 of the guide member 32, 32A, 32B is supported in the support mechanism 41, but the invention is not limited to this. For example, the center in the longitudinal direction of the guide member 32, 32A, 32B may be supported in the support mechanism 41.

Also, in the embodiment described above, the support mechanism 41 includes the first support member 42 and the second support member 43, but may include only one of the support members. When the support mechanism 41 includes only the first support member 42, the first support member 42 is fixed to the furnace wall 20. When the support mechanism 41 includes only the second support member 43, the vertical plate part 47 of the second support member 43 pivotally supports the guide member 32, 32A, 32B in the vertical direction directly without intervention of the first support member 42.

Also, in the embodiment described above, the first support member 42 slidably supports the proximal end 37 of the guide member 32, 32A, 32B in the longitudinal direction of the guide member 32, 32A, 32B, but in addition to this (instead of this), the first support member 42 may slidably support the proximal end 37 in a direction orthogonal to the longitudinal direction of the guide member 32, 32A, 32B.

The invention has been described in detail with reference to the specific embodiment, but it is apparent to those skilled in the art that various changes or modifications can be made without departing from the spirit and scope of the invention.

The present application is based on Japanese patent application No. 2009-164347 filed on Jul. 13, 2009, and the contents of the patent application are hereby incorporated by reference.

INDUSTRIAL APPLICABILITY

According to the invention, a method and a device for manufacturing a glass sheet capable of easily adjusting a shape dimension of a glass ribbon can be provided.

DESCRIPTION OF REFERENCE NUMERALS AND SIGNS

11 MOLDED BODY
11a UPPER EDGE
11b LOWER EDGE PART
11c LOWER EDGE
15 MOLTEN GLASS
15A GLASS RIBBON
32 GUIDE MEMBER
33 DISTAL END
33a SIDE SURFACE
33Bb DISTAL END FACE
34 PROTRUSION
61 TEMPERATURE ADJUSTING MEMBER
81 CONVEX PART

The invention claimed is:

1. A method for manufacturing a glass sheet, the method comprising:

running down molten glass along both side surfaces of a molded body;

joining and integrating the molten glass just under a lower edge part of the molded body; and drawing downward and molding an integrated sheet-shaped glass ribbon, wherein a guide member which contacts an end in a width direction of a joined molten glass is provided, and a relative position and/or a relative angle between the guide member and a lower edge of the molded body is/are adjusted, wherein a surface of the distal end of the guide member has a first region which contacts with the joined molten glass and wets, and a second region in which the joined molten glass is more resistant to wetting than the first region, and wherein a taper-shaped protrusion projecting downward is formed in the distal end of the guide member.

2. The method for manufacturing a glass sheet according to claim 1, wherein the end in the width direction of the joined molten glass runs down while contacting with both side surfaces of a distal end of the guide member.

3. The method for manufacturing a glass sheet according to claim 1, wherein an end face in the width direction of the joined molten glass runs down while contacting with a distal end face of the distal end of the guide member.

4. The method for manufacturing a glass sheet according to claim 3, wherein a cross-sectional shape when viewing the distal end face of the guide member from a flow direction of the glass ribbon is a circularly arcuate concave curved surface or a flat surface.

5. The method for manufacturing a glass sheet according to claim 3, wherein the distal end face of the guide member is provided with a convex part, and the end in the width direction of the joined molten glass runs down while contacting with both side surfaces of the convex part.

6. The method for manufacturing a glass sheet according to claim 1, wherein a temperature of the guide member is adjusted.

7. The method for manufacturing a glass sheet according to claim 1, wherein an average thickness of a center in a width direction of the glass ribbon after molding is 0.3 mm or less.

8. A method for manufacturing a glass sheet, the method comprising:

running down molten glass along both side surfaces of a molded body;

joining and integrating the molten glass just under a lower edge part of the molded body; and drawing downward and molding an integrated sheet-shaped glass ribbon, wherein a guide member which contacts an end in a width direction of a joined molten glass is provided, and a relative position and/or a relative angle between the guide member and a lower edge of the molded body is/are adjusted, wherein a surface of the distal end of the guide member has a first region which contacts with the joined molten glass and wets, and a second region in which the joined molten glass is more resistant to wetting than the first region, wherein a taper-shaped protrusion projecting downward is formed in the distal end of the guide member, and wherein guide walls are respectively extended halfway from an upper edge of the molded body toward a lower edge of the molded body in the vicinities of both right and left ends of the both side surfaces of the molded body, and ends in a width direction of the molten glass running down such that the molten glass contacts with inner wall surfaces of the guide walls of both right and left sides while the guide walls contacting with the side surfaces of the molded body, and wherein the molten glass-ends run down while contacting with the side surfaces of the molded body and both surfaces of inner wall surfaces of the guide walls.

9. The method for manufacturing a glass sheet according to claim 8, wherein the end in the width direction of the joined molten glass runs down while contacting with both side surfaces of a distal end of the guide member.

10. The method for manufacturing a glass sheet according to claim 8, wherein an end face in the width direction of the joined molten glass runs down while contacting with a distal end face of the distal end of the guide member.

11. The method for manufacturing a glass sheet according to claim 10, wherein a cross-sectional shape when viewing the distal end face of the guide member from a flow direction of the glass ribbon is a circularly arcuate concave curved surface or a flat surface.

12. The method for manufacturing a glass sheet according to claim 10, wherein the distal end face of the guide member is provided with a convex part, and the end in the width direction of the joined molten glass runs down while contacting with both side surfaces of the convex part.

13. The method for manufacturing a glass sheet according to claim 8, wherein a temperature of the guide member is adjusted.

14. The method for manufacturing a glass sheet according to claim 8, wherein an average thickness of a center in a width direction of the glass ribbon after molding is 0.3 mm or less.

\* \* \* \* \*